United States Patent
Chen et al.

(10) Patent No.: US 8,953,887 B2
(45) Date of Patent: Feb. 10, 2015

(54) PROCESSING TIME-BASED GEOSPATIAL DATA

(75) Inventors: Ching-Chien Chen, Temple City, CA (US); Craig A. Knoblock, El Segundo, CA (US); Cyrus Shahabi, Irvine, CA (US)

(73) Assignee: Terrago Technologies, Inc., Atlanta, GA (US)

( * ) Notice: Subject to any disclaimer, the term of this patent is extended or adjusted under 35 U.S.C. 154(b) by 348 days.

(21) Appl. No.: 12/965,725

(22) Filed: Dec. 10, 2010

(65) Prior Publication Data

US 2011/0142347 A1    Jun. 16, 2011

Related U.S. Application Data

(63) Continuation-in-part of application No. 12/501,242, filed on Jul. 10, 2009, which is a continuation-in-part of application No. 11/169,076, filed on Jul. 28, 2005, now Pat. No. 7,660,441.

(60) Provisional application No. 60/586,623, filed on Jul. 9, 2004.

(51) Int. Cl.
*G06K 9/46* (2006.01)
*G06F 17/30* (2006.01)

(52) U.S. Cl.
CPC ................... *G06F 17/30241* (2013.01)
USPC ........... 382/190; 382/103; 382/113; 382/294; 382/201; 707/727; 707/741; 707/736

(58) Field of Classification Search
CPC .................. G06T 2207/10016; G06T 7/0083; G06T 17/05; G06T 7/0028; G06K 9/48; G06K 9/3241; G06K 9/00476
USPC .......... 382/103, 113, 190, 294, 201; 707/727, 707/741, 736
See application file for complete search history.

(56) References Cited

U.S. PATENT DOCUMENTS

| | | | |
|---|---|---|---|
| 4,891,761 A | 1/1990 | Gray et al. |
| 5,546,107 A | 8/1996 | Deretsky et al. |
| 6,597,818 B2 | 7/2003 | Kumar et al. |
| 7,660,441 B2 | 2/2010 | Chen et al. |
| 7,822,751 B2 | 10/2010 | O'Clair et al. |
| 2001/0036302 A1 | 11/2001 | Miller |
| 2001/0038718 A1 | 11/2001 | Kumar et al. |
| 2003/0068071 A1 | 4/2003 | Wilson |
| 2005/0065959 A1 | 3/2005 | Smith et al. |
| 2005/0100220 A1 | 5/2005 | Keaton et al. |
| 2006/0101005 A1 | 5/2006 | Yang et al. |
| 2007/0014488 A1 | 1/2007 | Chen et al. |

(Continued)

OTHER PUBLICATIONS

Zhou, Y. et al, Hybrid index structures for location-based web search, CIKM, 2005.

(Continued)

*Primary Examiner* — Ruiping Li

(57) ABSTRACT

A method for processing geospatial datasets corresponding to geospatial objects, the method having the steps of extracting geospatial attributes from the geospatial datasets, locating extracted geospatial attributes corresponding to a particular geospatial object at a particular point in time, and generating output indicative of the particular geospatial object at the particular point in time utilizing the located geospatial attributes.

28 Claims, 13 Drawing Sheets

| | Object Name | Object Type | Object Location | Object Time | Object Misc. |
|---|---|---|---|---|---|
| 430a | Park Place | Street | 33.90433,-118.38786<br>33.90482,-118.38704<br>33.90506,-118.38636<br>33.90495,-118.38447 | May 2, 2001 | City of El Segundo announcement of expansion of Park Place street |
| 430b | Park Place | Street | 33.90789,-119.21355<br>33.91343,-119.24355 | March 13, 2002 | A portion of a marathon routes through Park Place |
| 430c | Park Place | Street | 33.91236,-119.23354<br>33.92243,-118.24358 | February 1, 2003 to March 1, 2003 | Park Place to be resurfaced, project to last two months |

(56) References Cited

U.S. PATENT DOCUMENTS

| | | | |
|---|---|---|---|
| 2009/0089254 A1* | 4/2009 | Von Kaenel et al. | 707/3 |
| 2009/0285487 A1 | 11/2009 | Knoblock et al. | |
| 2011/0007941 A1 | 1/2011 | Chen et al. | |
| 2011/0119265 A1 | 5/2011 | Shahabi et al. | |
| 2011/0280453 A1 | 11/2011 | Chen et al. | |

OTHER PUBLICATIONS

Hariharan, R. et al, Processing Spatial-Keyword (SK) Queries in Geographic Information Retrieval (GIR) Systems, SSDBM, 2007.

De Felipe, I. et al, Keyword Search on Spatial Databases, ICDE, 2008.

Cong, G. et al, Efficient Retrieval of the Top-k Most Relevant Spatial Web Objects, VLDB 2009.

Zhang, D. et al, Keyword Search in Spatial Databases: Towards Searching by Document, ICDE, 2009.

Chen, Y. et al, Efficient query processing in geographic web search engines, SIGMOD, 2006.

Jones, C.B. et al, The SPIRIT Spatial Search Engine: Architecture, Ontologies and Spatial Indexing, GIS, 2004.

Gianinetto et al. "Fusion of Aerial and Satellite Imagery Over the City of Venezia." 2nd GRSS/ISPRS Joint Workshop on Remote Sensing and Data Fusion over Urban Areas, May 22-23, 2003, pp. 216-219.

Chen et al. "Automatically annotating and integrating spatial datasets", Springer-Verlag Berlin Heidelberg, pp. 469-488, 2003.

Martins et al. "Indexing and Ranking in Geo-IR Systems", Proceedings of the 2005 workshop on Geographic information retrieval, pp. 31-34.

Doytsher. "A rubber sheeting algorithm for non-rectangle maps", Computer & Geosciences, 26, 2000.

* cited by examiner

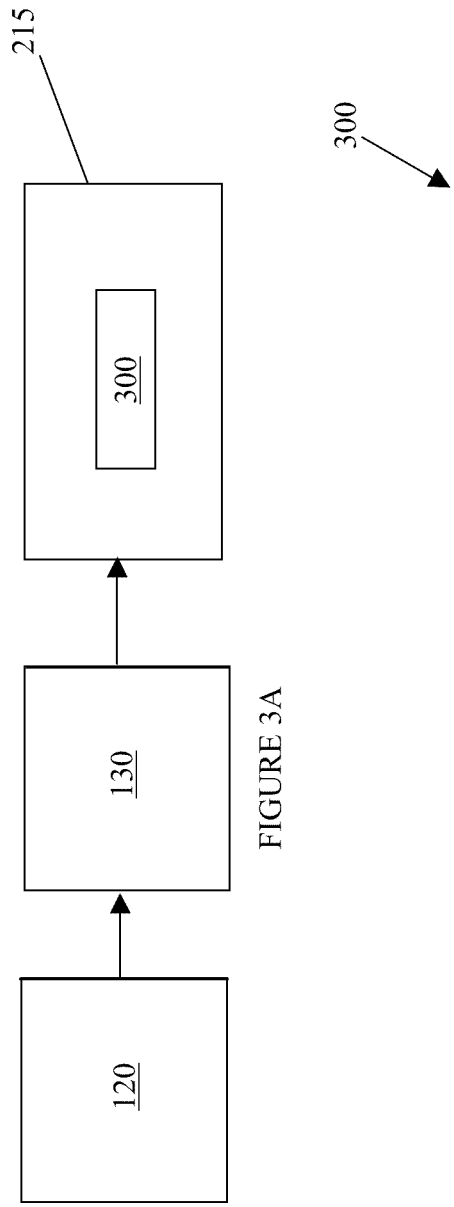

| Object Name | Object Type | Object Location | Object Time | Object Misc. |
|---|---|---|---|---|
| Park Place | Street | 33.90433,-118.38786<br>33.90482,-118.38704<br>33.90506,-118.38636<br>33.90495,-118.38447 | May 2, 2001 | City of El Segundo announcement of expansion of Park Place street |
| Park Place | Street | 33.90789,-119.21355<br>33.91343,-119.24355 | March 13, 2002 | A portion of a marathon routes through Park Place |
| Park Place | Street | 33.91236,-119.23354<br>33.92243,-118.24358 | February 1, 2003 to March 1, 2003 | Park Place to be resurfaced, project to last two months |

430a — (row 1)
430b — (row 2)
430c — (row 3)

FIGURE 4A

| Name | Type | Location | | Time |
|---|---|---|---|---|
| The Kennedy | Building | 33.90433,-118.38786<br>33.90482,-118.38704<br>34.90506,-118.38636<br>34.90495,-118.38447 | 720a<br>720b<br>720c<br>720d | December 16, 2009  715 |
| Abstract Plot | Land | 33.90433,-118.38786<br>33.90482,-118.38704<br>34.90506,-118.38636<br>34.90495,-118.38447 | 740a<br>740b<br>740c<br>740d | June 17, 2001  735 |

| | Name | Type | Location (Polygon) | Time (Date) |
|---|---|---|---|---|
| 910a | The Kennedy | Land | 33.90433,-118.38786 920a<br>33.90482,-118.38704 920b<br>33.90506,-118.38636 920c<br>33.90495,-118.38447 920d | July 2, 1998 |
| 910b | The Kennedy | Land | 33.90433,-118.38786 925a<br>33.90482,-118.38704 925b<br>33.90506,-118.38636 925c<br>33.90495,-118.38447 925d | January 4, 2001 940a |
| 910c | The Kennedy | Plot | 33.90433,-118.38786 930a<br>33.90482,-118.38704 930b<br>33.90506,-118.38636 930c<br>33.90495,-118.38447 930d | October 23, 2004 940b |
| 910d | The Kennedy | Building | 33.90433,-118.38786 935a<br>33.90482,-118.38704 935b<br>33.90506,-118.38636 935c<br>33.90495,-118.38447 935d | September 3, 2006 940c |

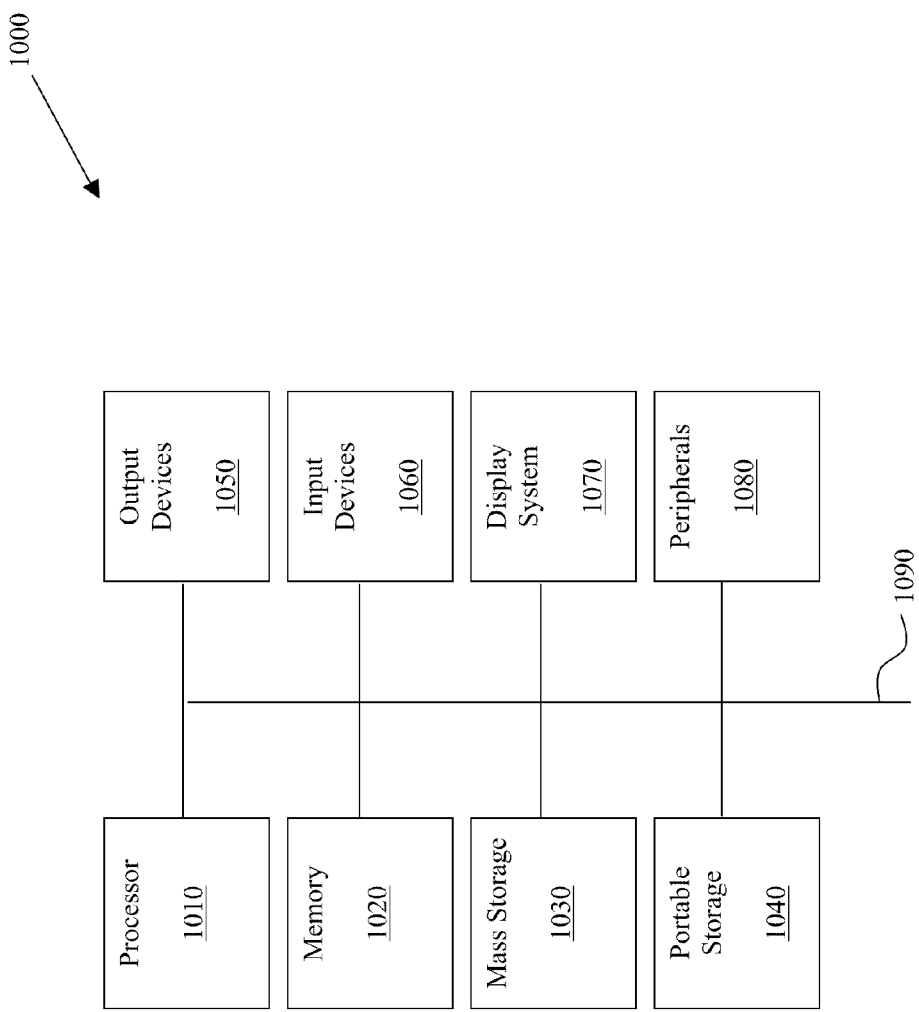

PROCESSING TIME-BASED GEOSPATIAL DATA

CROSS-REFERENCE TO RELATED APPLICATION

The present application is a continuation-in-part and claims the priority benefit of U.S. patent application Ser. No. 12/501,242 filed on Jul. 10, 2009, entitled "Precisely Locating Features on Geospatial Imagery," which is a continuation-in-part and claims priority benefit of U.S. patent application Ser. No. 11/169,076 filed on Jun. 28, 2005 and entitled "System and Method for Fusing Geospatial Data," now U.S. Pat. No. 7,660,441, which claims the benefit of U.S. Provisional Application No. 60/586,623, filed Jul. 9, 2004 and entitled "Automatically Annotating and Integrating Spatial Datasets," all of which are incorporated herein by reference in their entirety.

BACKGROUND OF THE INVENTION

1. Field of the Invention

The present invention relates generally to processing geospatial data, and more specifically, but not by way of limitation, to extracting geospatial attributes from geospatial datasets representing a particular geospatial object 2. Related Art In general geospatial objects may be represented by geospatial datasets. Additionally, geospatial datasets may be broadly categorized into structured and non-structured types of geospatial datasets. Structured geospatial datasets include, but are not limited to, non-structured geospatial images and geospatial vector data. Geospatial images are images of the Earth's surface taken from the air or from space. Geospatial vector data may include any type of data that associates spatial attributes such as latitude and longitude coordinates to various sites on the Earth's surface. Geospatial vector data may also include non-spatial attributes like road names, house numbers, ZIP codes, ownership information, associated telephone numbers, tax information, valuation information, and so on. Non-structured types of geospatial datasets may include both spatial and non-spatial information, for example, photographs, RSS feeds, articles, and the like.

As alluded to above, geospatial datasets, regardless of the type, may be broken down into constituent geospatial attributes. Geospatial attributes may be categorized by name, location, type, and/or temporal data such as a date, but may also include additional categories such as zip code, phone number, and the like. It will be understood that, the geospatial attributes for a particular geospatial object may change over time. For example, when a business changes physical locations, the geospatial attributes of location, phone number, zip code, and the like will change.

In practice, geospatial attributes extracted from, for example, geospatial vector data, may be aligned or otherwise associated with corresponding geospatial imagery to produce content rich maps. Unfortunately, association of geospatial datasets with geospatial imagery without regard to the synchronicity between the geospatial datasets and the geospatial imagery may lead to maps with obvious errors. Stated otherwise, geospatial imagery is a visual representation of a particular geospatial location at a particular point in time when the geospatial imagery was captured. Likewise, geospatial vector data includes geospatial attributes representative of a particular geospatial object at a particular point in time when the vector data was created. Therefore, geospatial attributes of geospatial vector data may conflict with geospatial attributes of geospatial imagery supposedly corresponding to the exact same geospatial location depending on the time frame during which both the geospatial imagery and the geospatial vector data were created. For example, temporally newer geospatial vector data such as latitude and longitude coordinates corresponding to the location of a building may be erroneously combined with older geospatial imagery that, while showing the same latitude and longitude coordinates, fail to show the building because the building was not built at the time the geospatial image was captured. Deleterious geolocation errors such as these require independent verification of the actual location of the building and may cause users to question the reliability of the geolocation services.

SUMMARY OF THE INVENTION

The present technology may include a method for processing geospatial datasets corresponding to geospatial objects, the method including the step of extracting geospatial attributes from the geospatial datasets, locating extracted geospatial attributes corresponding to a particular geospatial object at a particular point in time, and generating output indicative of the particular geospatial object at the particular point in time utilizing the located geospatial attributes.

A device for processing geospatial datasets corresponding to geospatial objects may have a memory for storing a program, a processor for executing the program, an extraction module stored in the memory and executable by the processor to extract geospatial attributes from the geospatial datasets and locate extracted geospatial attributes corresponding to a particular geospatial object at a particular point in time, and a generation module stored in the memory and executable by the processor to generate output indicative of the particular geospatial object at the particular point in time utilizing the located geospatial attributes.

Computer readable storage mediums may have a program embodied thereon, the program executable by a processor to perform a method for processing geospatial datasets corresponding to geospatial objects, the method including extracting geospatial attributes from the geospatial datasets, locating extracted geospatial attributes corresponding to a particular geospatial object at a particular point in time, and generating output indicative of the particular geospatial object at the particular point in time utilizing the located geospatial attributes.

BRIEF DESCRIPTION OF THE DRAWINGS

FIGS. 3A and 3B collectively illustrate an example of processing geospatial datasets to extract geospatial attributes.

FIGS. 4A and 4B collectively illustrate an exemplary process of creating a visual representation (a timeline) from geospatial attributes extracted from geospatial datasets corresponding to a particular geospatial object over a range of dates.

FIGS. 9A-D collectively illustrate an exemplary process of approximating a geospatial attribute indicative of time for a geospatial dataset lacking a geospatial attribute indicative of time.

FIG. 10 illustrates an exemplary computing system that may be used to implement an embodiment of the present technology.

DETAILED DESCRIPTION OF EXEMPLARY EMBODIMENTS

Figure 1:
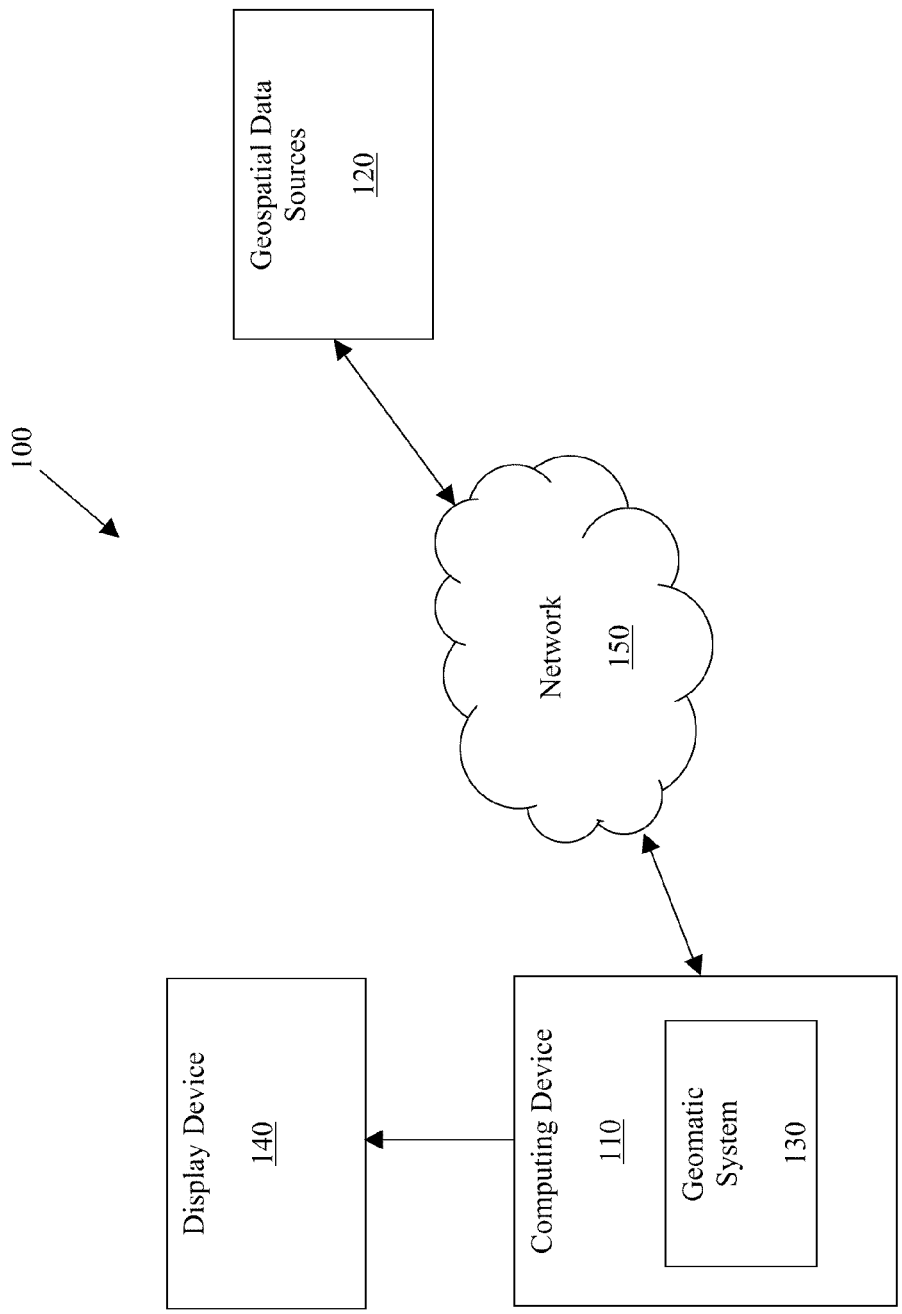
FIG. 1 is a block diagram of an exemplary environment for practicing embodiments of the present technology.

Referring now to FIG. 1, a block diagram of an exemplary environment 100 for practicing embodiments of the present technology is shown. The environment 100 includes a computing device 110 and geospatial data sources 120. Computing device 110 includes geomatic system 130 that may be connected to display device 140 and may communicate with geospatial data sources 120. The geomatic system 130 is discussed in further detail in connection with FIG. 2. Other various components (not shown) that are not necessary for describing the present technology may also be included in the environment 100, in accordance with exemplary embodiments. Examples of the computing device 110 may be a desktop personal computer (PC), a laptop PC, a pocket PC, a personal digital assistant (PDA), a smart phone, a cellular phone, a global positioning system (GPS) device, and so on. Computing device 110 is discussed in more detail with respect to FIG. 10.

The geospatial data sources 120 may comprise any repository, compilation, database, server, or other source of geospatial such as geospatial imagery and/or geospatial vector data, or other information indicative of a particular geospatial object. The geospatial data sources 120 may be provided by a private organization or federal, state, or municipal governments. For example, one geospatial data sources 120 may include geospatial imagery from the U.S. Geological Survey (USGS).

According to exemplary embodiments, geomatic system 130 may access geospatial data sources 120 via a network 150, which may be implemented as any wide area network (WAN), local area network (LAN), the Internet, an intranet, a public network, a private network, a combination of these, or some other data transfer network. The geospatial datasets received from the geospatial data sources 120 may be provided to the geomatic system 130 via the computing device 110 as a computer readable storage medium read by the computing device 110, such as by compact disk.

Figure 2:
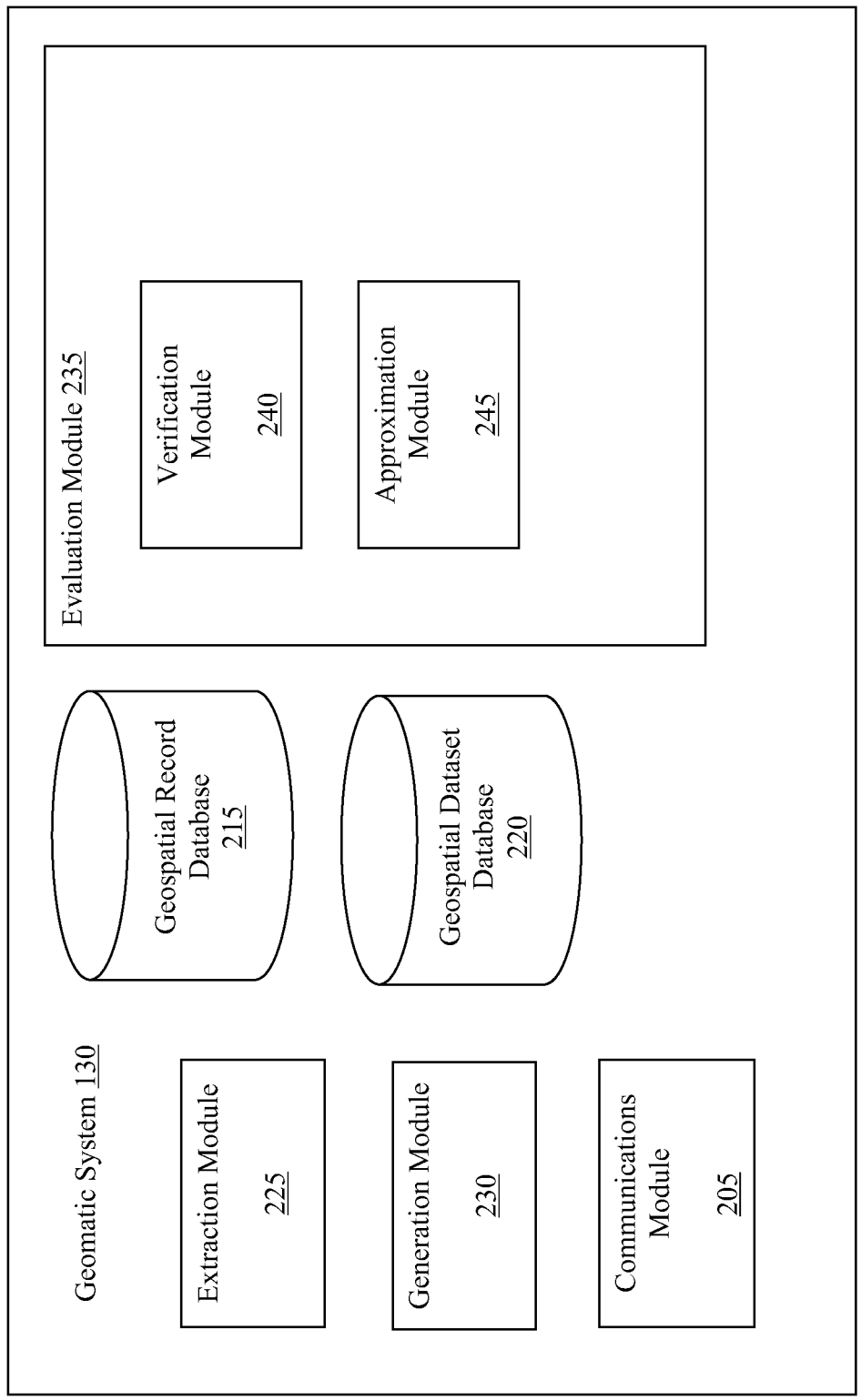
FIG. 2 is a block diagram of an exemplary geomatic system.

FIG. 2 is a block diagram of the exemplary geomatic system 130. As depicted, the geomatic system 130 includes a communications module 205, a geospatial record database 215, geospatial dataset database 220, an extraction module 225, a generation module 230, and an optional evaluation module 235 having a verification module 240 and an approximation module 245. Programs comprising engines, modules, and databases of the geomatic system 130 may be stored in memory of the computing device 110. Additionally, the constituent engines and modules may be executed by a processor of the computing device 110 to effectuate respective functionalities attributed thereto. It is noteworthy that the geomatic system 130 may be composed of more or fewer modules and engines (or combinations of the same) and still fall within the scope of the present technology. For example, the functionalities of the extraction module 225 and the functionalities of the evaluation module 235 may be combined into a single module or engine.

Execution of the communications module 205 facilitates communication of data and information between the geomatic system 130 and the computing device 110. For example, geospatial datasets such as geospatial imagery, geospatial vector data, photographs, or maps may be transferred to the geomatic system 130 through execution of the communications module 205. Likewise, data and information may be provided to a user from the geomatic system 130 by way of execution of the communications module 205. Additionally, the communications module 205 may be executed to provide communication between constituent engines, modules, and databases of the geomatic system 130.

Referring now to FIGS. 3A and 3B collectively, one or more various geospatial record databases 215 may be employed by the geomatic system 130 to store geospatial datasets in the form of geospatial records 300. According to exemplary embodiments, the geospatial record database 215 stores geospatial records 300 received from the geomatic system 130. Such geospatial records 300 include geospatial attributes received from the geospatial data sources 120 may be extracted from geospatial datasets. Geospatial attributes may be extracted from both structured geospatial data including, but not limited to geospatial imagery, vector data, or maps and non-structured geospatial data such as photographs, articles, web-blog posts, and RSS feeds. It will be understood that geospatial attributes may be extracted from non-structured sources such as newspaper article, PDF document, and RSS feeds by searching the text of the source or by extracting and searching the metadata of the source.

Each geospatial dataset is indicative of a particular geospatial object such as a geospatial extent (located), building, school, road, church—just to name a few. The geospatial attributes extracted from the geospatial datasets may be arranged into sets which may be stored as entries, for example, entries 305a and 305b in geospatial record 300.

In greater detail, entries 305a and 305b may be further divided and organized by attribute types, for example, name 310, type 315, location 320, and time 325. In one embodiment, name 310 may include any type of character string, alphanumeric, symbolic, or combinations thereof that are representative of a particular geospatial object, for example, the common name of a building. Type 315 refers to the particular toponymic designation of the geospatial object such as hotel, restaurant, school—just to name a few. Location 320 also known as "spatial extent" refers to a geospatial reference point, or collection of points, that define a particular geospatial object. Common types of location 320 data include a latitude and longitude coordinate or multiple coordinates connected together to form (frequently utilized for roads) or polygons (frequently utilized for buildings).

Additionally, time (date) 325 includes time data indicative of the date on which the geospatial dataset was created. Non-limiting examples of object time 325 data may include the date on which a geospatial image was captured, the date on which a photograph of a geospatial object was taken, an event date indicative of the date for an event written about in an electronic article, or the creation date of a PDF document that includes geospatial data such as building vector data. It will be understood that time (date) 325 data may be indicative of a particular point in time, such as the exact hour and minute of a particular day, or may be indicative of a range of dates.

According to other embodiments, the geospatial record database 215 may include any number of databases predicated upon different types of geospatial records 300 as described above. It will be understood that geospatial records 300 may be indexed or otherwise coordinated to so that geospatial attributes corresponding to a particular geospatial object may be efficiently retrieved from the correct geospatial record 300.

In addition to storing the geospatial attributes in geospatial records 300, the geospatial datasets may be stored in the geospatial dataset database 220 and cross-linked or otherwise associated with the geospatial attributes extracted therefrom.

In general, a method for processing geospatial datasets includes executing the extraction module 225 of the geomatic system 130 to extract geospatial attributes from the geospatial datasets received from the geospatial data sources 120. Next, the extraction module 225 locates extracted geospatial attributes corresponding to a particular geospatial object at a particular point in time. Finally, the generation module 230 generates an output based upon the located geospatial attributes.

Illustrative Examples

Figure 3C:
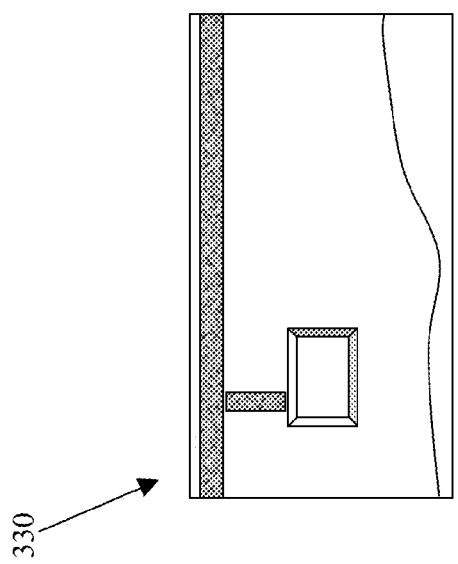
FIGS. 3C and 3D collectively illustrate an example of utilizing the extracted geospatial attributes of FIGS. 3A and 3B to create a content rich map.
Figure 3D:
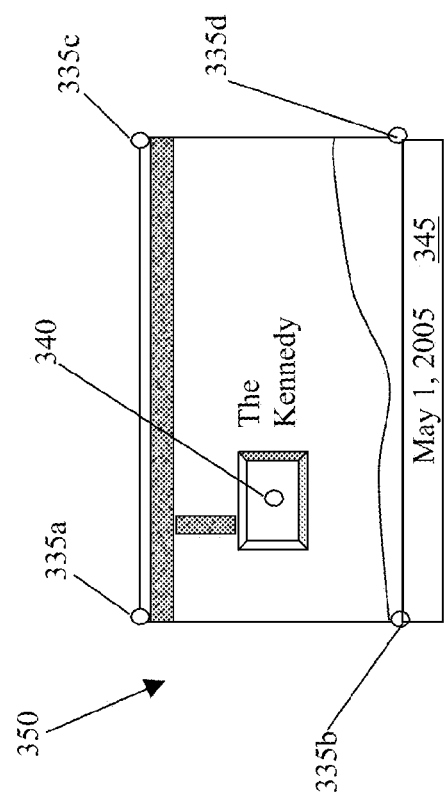

Referring now to FIGS. 3B-3D collectively, the extraction module 225 (FIG. 2) extracts geospatial attributes from a plurality of geospatial datasets. To create output representative of a geospatial extent defined by a latitude and longitude coordinate of 23.39234, −119.94743, as it existed on May 1, 2005, the extraction module 225 locates entries 305a and 305b which correspond to that particular coordinate for that particular date. The extraction module 225 locates entry 305a that includes geospatial attributes extracted from a geospatial image 330 and entry 305b includes geospatial attributes extracted from building vector data.

The generation module 230 utilizes the entries 305a and 305b, along with the geospatial image 330 cross-linked to entry 305a to create a content rich map 350 by aligning the geospatial attributes of the entries 305a and 305b with the geospatial image 330 by utilizing location data 335a-d and 340 of entries 305a and 305b, respectively. Additionally, location data 335a-d may be connected together to form a polygon representing the spatial extent of the geospatial image 330. For reference purposes, additional geospatial attributes may be aligned to the geospatial image 330 such as time 345. Additionally, name 310 of entry 305b may be aligned proximate the location 340 of entry 305b. In an alternative embodiment (not shown), the geospatial attribute of name 310 of entry 305b may be utilized to create a legend with reference numbers aligned to the geospatial image 330 proximate the location 320 of entry 305b.

Figure 4B:
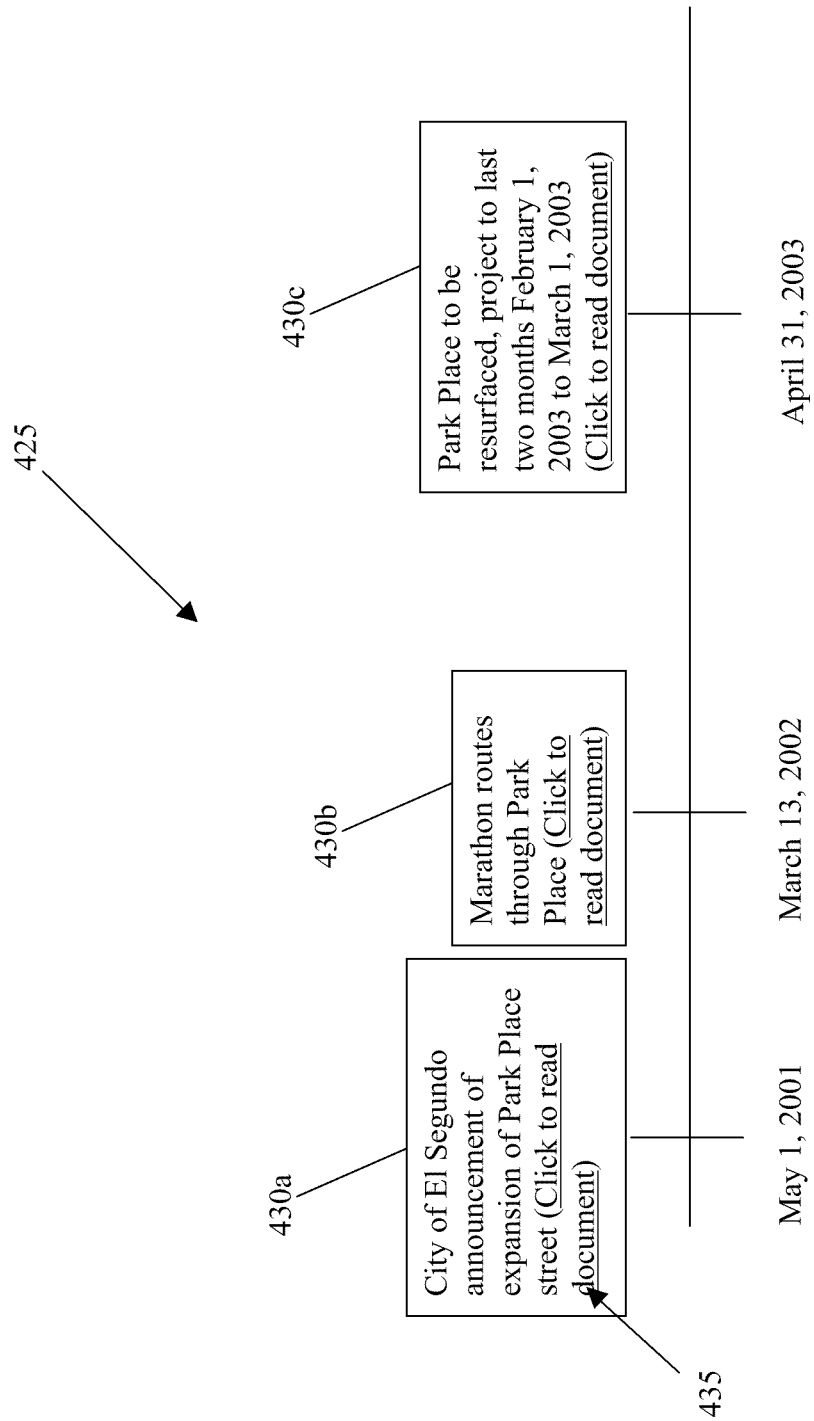

Referring to FIGS. 4A and 4B collectively, in another embodiment, extraction module 225 may be unable to locate geospatial imagery corresponding to the geospatial attributes of a particular geospatial object, and therefore generation module 230 may function to generate other types of output indicative of the particular geospatial object for a given range of dates, for example a timeline 425. Timeline 425 is particularly valuable for depicting changes to geospatial objects over a period of time. For example, extraction module 225 may locate entries 430a-c indicative of a particular road with the name of "Park Place" with miscellaneous data including the location name of "El Segundo, Calif." for any date.

The generation module 230 arranges the geospatial entries 430a-c in chronological order to create a timeline 425. Each entry 430a-c located along the timeline 425 may include a hyperlink 435 to the geospatial dataset from which the geospatial attribute 430a-c was extracted. In this example, geospatial attribute 430a includes road expansion data gathered from a non-structured geospatial dataset such as document created and published by a city planner. Geospatial attribute 430b includes at least a portion of marathon route data extracted from another non-structured dataset such as a website providing information on the dates and routes of marathons corresponding to the particular geospatial object such a "Park Place" road. In some embodiments, each entry may include a name, type, spatial extent, and temporal extent. Finally, geospatial attribute 430c includes textual data indicative of roadwork that was extracted from a non-structured dataset such as an online newspaper article.

Figure 5A:
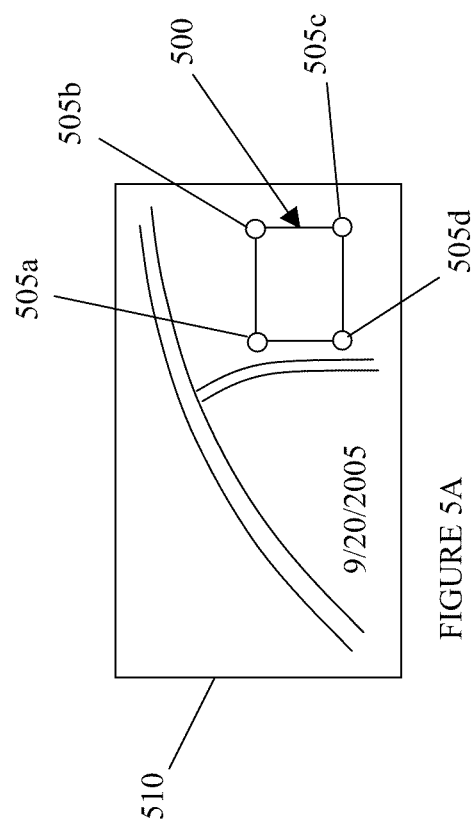
FIGS. 5A and 5B collectively illustrate an exemplary process of creating a visual representation of the changes to a particular geospatial location over a period of time.
Figure 5B:
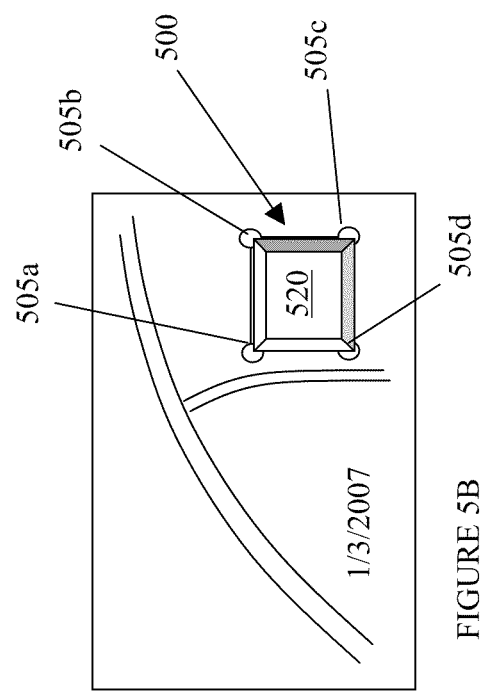

Referring now to FIGS. 5A and 5B collectively, in one additional example, changes to the physical appearance of a geospatial object 500 such as a particular plot of land represented by location data 505a-d defined by latitude and longitude coordinates may be visually represented over a period of time. Utilizing the desired location data 505a-d, extraction module 225 searches entries for extracted geospatial attributes having cross linked to geospatial images corresponding to the location data 505a-d. For example, the extraction module 225 locates geospatial images 510 and 515 corresponding to location data 505a-d taken at distinct times Sep. 20, 2005 and Jan. 3, 2007, respectively. The generation module 230 arranges the geospatial images 510 and 515 chronologically, and in this embodiment, vertically to illustrate changes to geospatial object 500 over time such as the addition of building 520. Additionally, the generation module 230 aligns location data 505a-d to each of the geospatial images 510 and 515 so that the particular geospatial object 500 may be readily ascertained. Dates have been aligned to the geospatial images 510 and 515 for reference purposes.

It will be understood that similarly to other previously described embodiments, additional geospatial attributes may be aligned to the geospatial images 510 and 515 to convert the geospatial images 510 and 515 to rich content maps. It will further be understood that geospatial images 510 and 515 and appropriate geospatial attributes may be aligned, superimposed, or otherwise associated with one another to provide a layering effect or morphological/transitioning effect illustrating changes to the geospatial object 500 over a period of time. The details of these effects are beyond the scope of this document, but would be readily understood and implemented by one of ordinary skill in the art.

Verification of Geospatial Attributes

Figure 6:
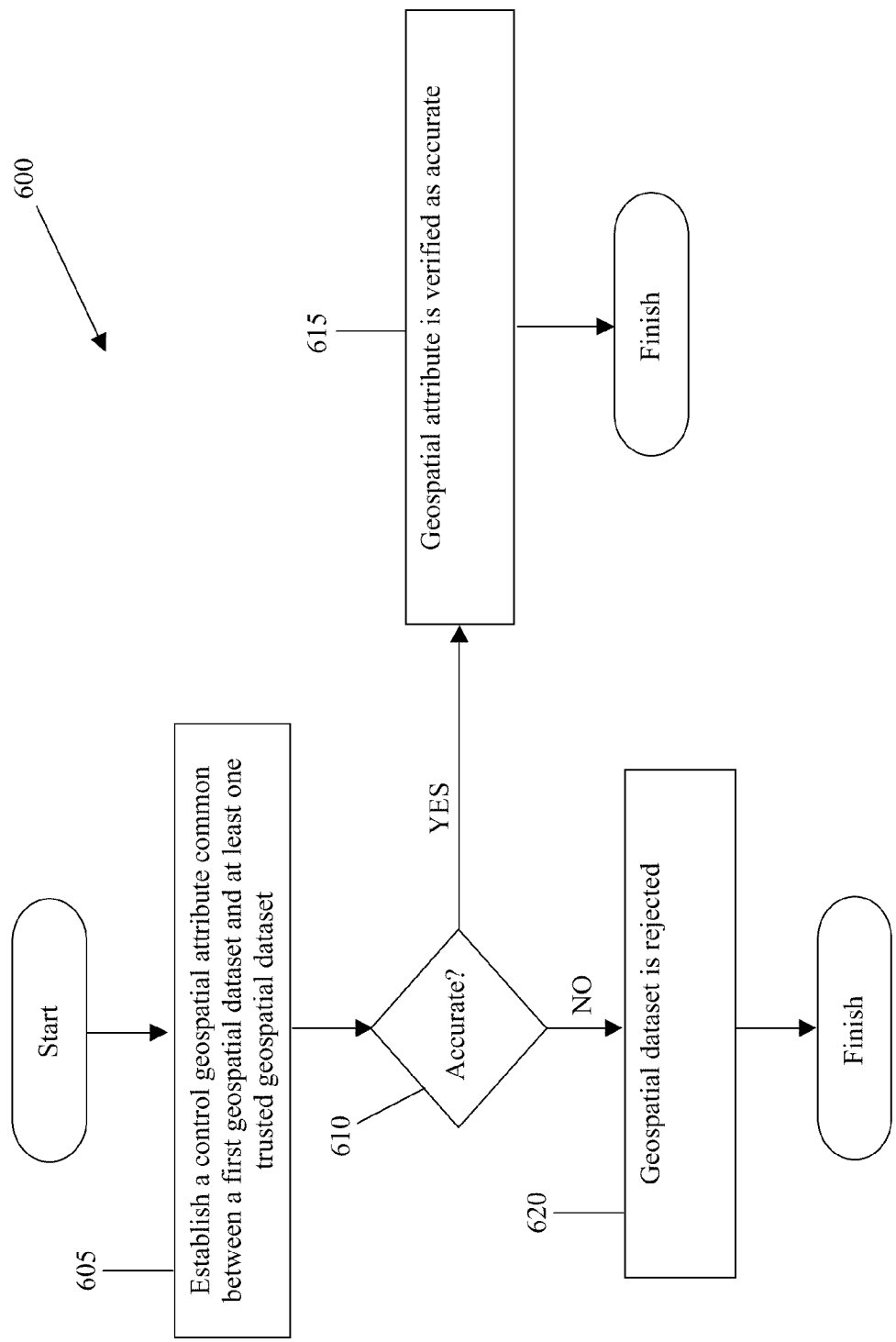
FIG. 6 is a flowchart of an exemplary method for verifying the accuracy of geospatial attributes.

Referring now to FIG. 6, shown therein is a flowchart of an exemplary method of evaluating an extracted geospatial attribute for accuracy. As stated previously, it is common to combine two or more geospatial datasets together to form a content rich map. Unfortunately, combinations of geospatial datasets may produce erroneous geospatial maps if one or more of the geospatial datasets include erroneous geospatial attributes. For example, building vector data may include erroneous geospatial attributes indicating that a particular building was located at a particular location on a particular date. These erroneous geospatial attributes may be detected by aligning the building vector data to a trusted geospatial image corresponding to the same location taken on approximately the same date. The geospatial image is then evaluated to determine whether the building existed at the asserted location on the asserted date.

A method 600 for evaluating an extracted geospatial attribute for accuracy includes a first step 605 of executing the verification module 240 (FIG. 2) to establish a control geospatial attribute common between a first geospatial dataset and at least one trusted geospatial dataset. It will be understood that the term "trusted geospatial datasets" includes geospatial datasets where the accuracy of the geospatial datasets may be assumed. Such geospatial datasets come from trusted sources such as federal, state, city, or municipal governments, commercial sources, or other trustworthy sources.

Next, in step 610 at least one geospatial attribute of the first geospatial dataset is compared to the same geospatial attribute of the at least one trusted geospatial dataset to determine a margin of error for the geospatial attribute. It will be understood that the geospatial attribute evaluated for accuracy is preferably not one of the geospatial attributes common between the first geospatial dataset and the trusted geospatial dataset. It will further be understood that the margin of error may vary based on the application, or not used at all. A margin of error may be expressed as a percentage of difference between the geospatial attribute of the first geospatial dataset and the geospatial attribute of the trusted geospatial dataset. For example, if the percentage is low, for example five percent or lower, the geospatial attribute is verified accurate as shown in step 615. Alternatively, the present system may not utilize a fixed threshold to determine margin of error. Rather, an acceptable margin of error may be determined on a case-by-case basis. For example, an accuracy threshold may change over time as new datasets become more accurate. Additionally, the present technology may not utilize any thresholds whatsoever and not determine any margin of error.

For embodiments that utilize a margin of error, if the margin of error is greater than a threshold for the system, it is assumed that the geospatial attribute is erroneous. The geospatial dataset may then be rejected as inaccurate as shown in step 620.

Illustrative Example

Figures 7A, 7B, 7C:
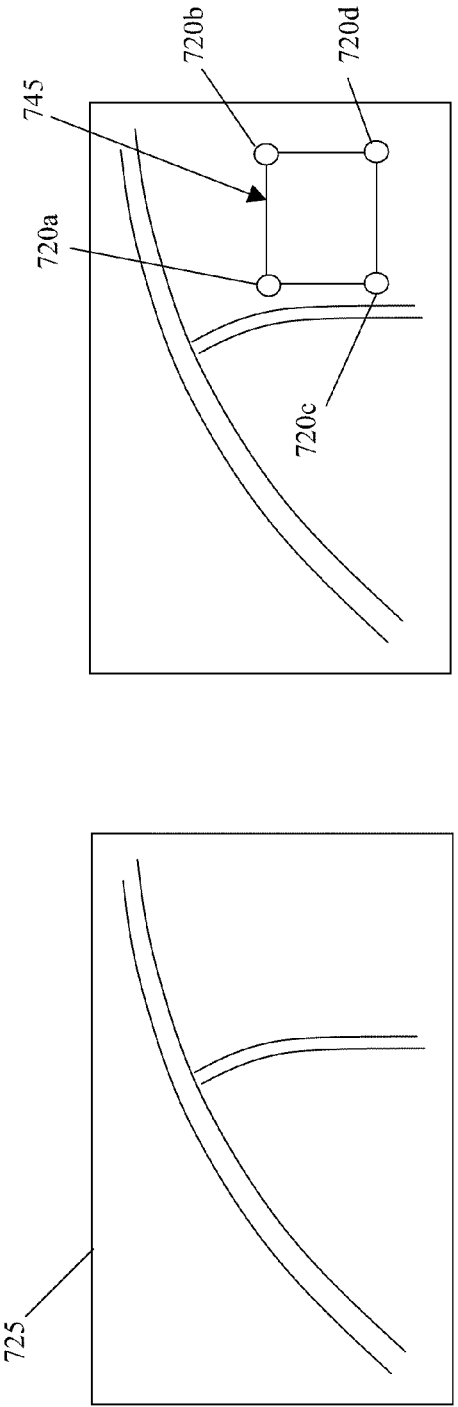
FIGS. 7A-7C collectively illustrate an exemplary process of verifying the accuracy of geospatial attributes of a first geospatial dataset.

Referring now to FIGS. 7A-7C collectively, which illustrate the creation of an erroneous content rich map. With respect to FIG. 7A, geospatial attributes are extracted from building vector data and arranged into geospatial record 700 as an entry 705. The building vector data includes geospatial attributes indicative of time 715 and location 720*a-d*. It will be understood that the building vector data is the trusted geospatial dataset. Additionally, extracted geospatial attributes for a geospatial image 725 are shown as entry 730. The geospatial image includes geospatial attributes indicative of time 735 and location 740*a-d*.

FIGS. 7B and 7C collectively illustrate the indiscriminate alignment of the building vector data contained in entry 705 with the geospatial image 725, wherein location data 720*a-d* corresponding to the location of the footprint of a building are aligned to the geospatial image 725. The location data 725*a-d* are connected together to form a polygon 745 indicative of the footprint of the building. As is apparent, the polygon 745 surrounds an empty lot. Therefore, it may be inferred that the geospatial attribute indicative of time extracted from geospatial image 725 is incorrect.

To avoid generating such erroneous geospatial maps, geospatial attributes indicative of time for geospatial images may be verified via execution of method 600 as described above. More specifically, a control geospatial attribute is established, which in this instance includes location data 725*a-d* and 740*a-d* that are commonly shared between the building vector data and the geospatial image 725. Next, the date 735 of the geospatial image 725 is evaluated for accuracy by aligning (drawing a polygon) the extracted geospatial attributes of entry 710 to the geospatial image 725 and evaluating one or more of the pixels within the polygon to determine whether the pixels substantially correspond to a building. It will be understood that physical objects located on geospatial images may be detected by examining the pixels of a geospatial images within a given area. The examined pixels may be compared to known pixel patterns. For example, roads, buildings, and trees all have unique pixel patterns. Evaluating the pixel patterns within the common location represented by polygon 745 reveals that the pixels within the polygon 745 are not indicative of pixel patterns corresponding to buildings.

Inferential Approximation of Geospatial Attributes

Figure 8:
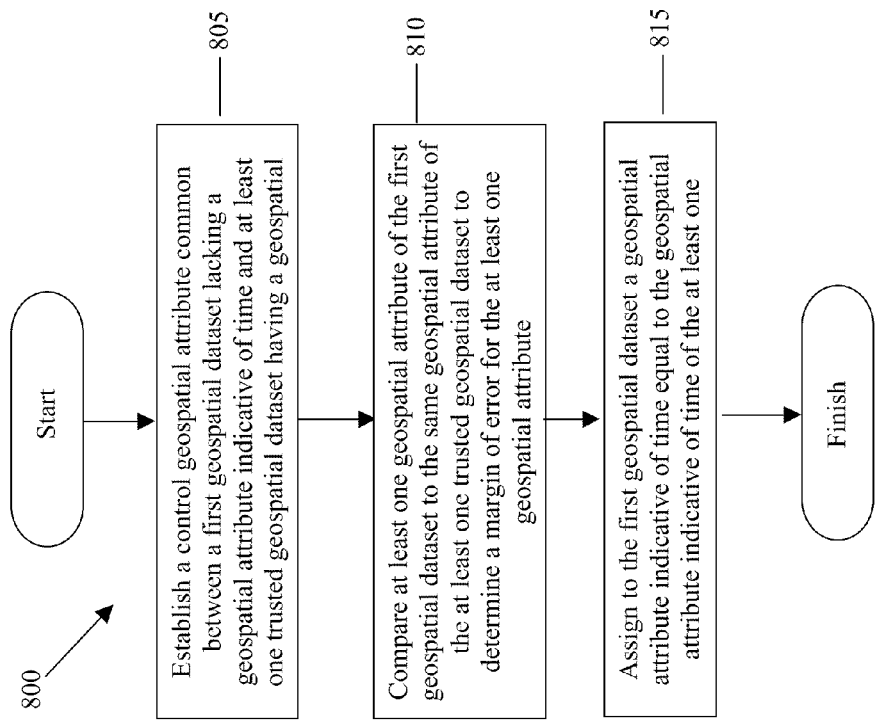
FIG. 8 is a flowchart of an exemplary method for approximating a geospatial attribute indicative of time.
Figure 9B:
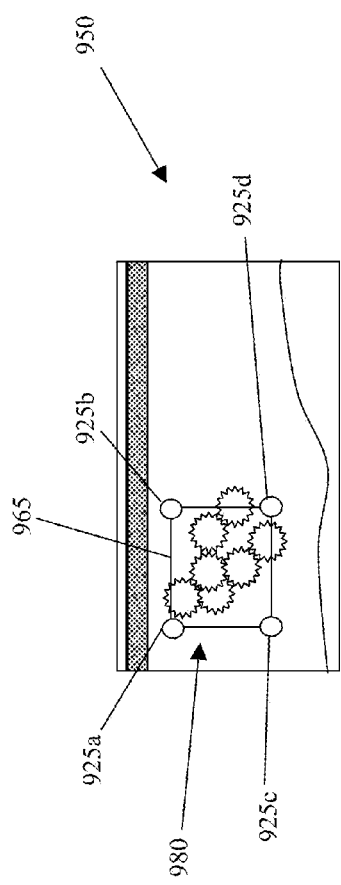
Figure 9C:
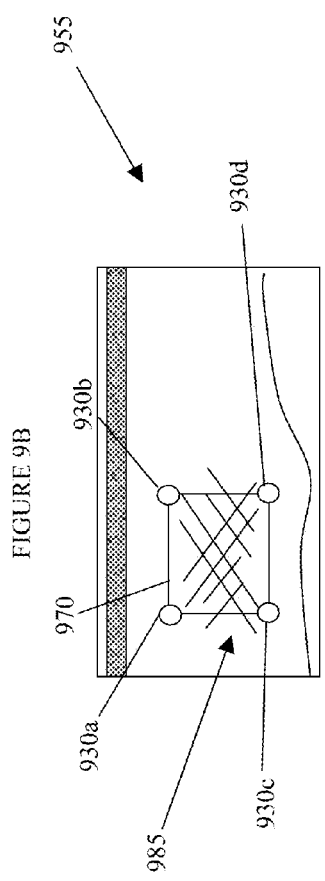
Figure 9D:
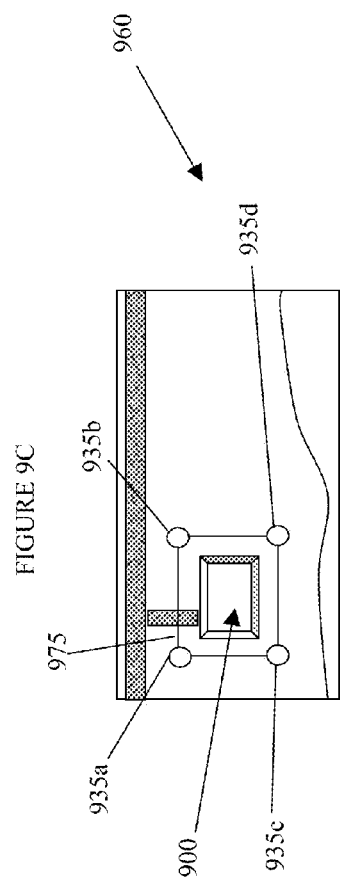

An approximate time may be determined for a geospatial dataset lacking geospatial attributes indicative of time by execution of method 800 shown in FIG. 8.

The method 800 includes the step 805 of executing the approximation module 245 (FIG. 2) to establish a control geospatial attribute common between a first geospatial dataset lacking a geospatial attribute indicative of time and at least one trusted geospatial dataset having a geospatial attribute indicative of time. After establishing a control geospatial attribute, the next step 810 of the method includes the approximation module 245 to compare at least one geospatial attribute of the first geospatial dataset to the same geospatial attribute of the at least one trusted geospatial dataset to determine a margin of error for the at least one geospatial attribute. The margin of error may be expressed as appropriate to the system, such as for example as a percentage of difference between the geospatial attribute of the first geospatial dataset and the geospatial attribute of the trusted geospatial dataset, a fixed value, or not at all. Hence, in some embodiments, no margin of error is determined.

In the next step 815, the approximation module 245 assigns to the first geospatial dataset a geospatial attribute indicative of time equal to the geospatial attribute indicative of time of the at least one trusted geospatial dataset if the margin of error is within a predetermined range of percentages, for example, between zero and five percent.

Illustrative Example

FIGS. 9A-9D collectively illustrate a method for approximating a finalized construction date for a building 900. It will be understood by those skilled in the art that trusted geospatial data indicative of the building 900 includes building vector data generated by a municipal government. Geospatial attributes are extracted from the building vector data by the extraction module 225 (FIG. 2) and arranged into categories 905*a-d* in an entry 910*a* that is stored in a geospatial record 915. Geospatial attributes indicative of location are stored in category 905*c* and include longitude and latitude data 920*a-d*. The extraction module 225 extracted no geospatial attributes indicative of time.

To approximate a completion date for a particular geospatial object such as a building, the approximation module 245 is executed to establish a control geospatial attribute common between the first geospatial dataset lacking a geospatial attribute indicative of time and at least one trusted geospatial dataset having a geospatial attribute, which in this case includes geospatial attributes indicative of location. In this instance trusted entries 910*b-d* having a common location data 925*a-d*, 930*a-d*, and 935*a-d*, respectively are located by the approximation module 245.

The approximation module 245 obtains geospatial images cross-linked to the entries 910*b-d* and aligns the location data location data 925*a-d*, 930*a-d*, and 935*a-d* for each entry 910*b-d* to each geospatial image to produce content rich maps 950-960 having polygons 965-975, respectively. Maps are chronologically and vertically aligned according to dates 940*b-d*.

Similarly to the aforementioned examples, the pixels within polygons 965-975 within each of the content rich maps 950-960 are evaluated to determine the object located within the polygons 965-975. Map 950 includes pixels within polygon 965 that are indicative of trees 980, but no building. Map 955 includes pixels within polygon 970 that are indicative of cleared land 985, but no building. Lastly, map 960 includes pixels within polygon 975 that are indicative of a building 900. Therefore, it may be inferred that the building 900 was completed sometime between the object date times 940b and 940c, giving the building 900 an approximate finalized construction date of between Oct. 23, 2004 and Sep. 3, 2006.

FIG. 10 illustrates an exemplary computing system 1000 that may be used to implement an embodiment of the present technology. System 1000 of FIG. 10 may be implemented in the contexts of the likes of computing device 110 and a server implementing geospatial data source 120. The computing system 1000 of FIG. 10 includes one or more processors 1010 and main memory 1020. Main memory 1020 stores, in part, instructions and data for execution by processor 1010. Main memory 1020 may store the executable code when in operation. The system 1000 of FIG. 10 further includes a mass storage device 1030, portable storage device(s) such as for example portable storage medium drive(s) 1040, output devices 1050, user input devices 1060, a graphics display 1070, and peripheral devices 1080.

The components shown in FIG. 10 are depicted as being connected via a single bus 1090. The components may be connected through one or more data transport means. Processor unit 1010 and main memory 1020 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive or an optical disk drive, is a non-volatile storage device for storing data and instructions for use by processor unit 1010. Mass storage device 1030 may store the system software for implementing embodiments of the present invention for purposes of loading that software into main memory 1020.

Portable storage device 1040 operates in conjunction with a portable non-volatile storage medium, such as a floppy disk, compact disk, digital video disc, or USB storage device, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1050. Suitable output devices include speakers, printers, network interfaces, and monitors.

Display system 1070 may include a liquid crystal display (LCD) or other suitable display device. Display system 1070 receives textual and graphical information, and processes the information for output to the display device.

Peripherals 1080 may include any type of computer support device to add additional functionality to the computer system. Peripheral device(s) 1080 may include a modem or a router.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:
   extracting from a geospatial record database a geospatial dataset associated with a geospatial object, the geospatial dataset including geospatial attribute data associated with the geospatial object for a first point in time and a second point in time; and
   generating an output indicative of the geospatial dataset, the output including a first geospatial attribute data entry associated with the geospatial object for the first point in time received in the geospatial record database from a first geospatial data source, and a second geospatial data entry associated with the geospatial object for the second point in time received in the geospatial record database from a second geospatial data source.

2. The method of claim 1, wherein the first geospatial attribute data entry and the second geospatial data entry each include a name, a type, a location, and a point in time associated with the geospatial object.

3. The method of claim 1, further comprising: generating a content rich map including an indication of the geospatial object associated with at least one of the first point in time or the second point in time, the content rich map being generated by:

extracting from the geospatial record database a geospatial image associated with a location of the geospatial attribute;

aligning the geospatial attribute to the geospatial image based on the location associated with the geospatial attribute; and outputting the content rich map via a display device.

4. The method of claim 1, wherein the first geospatial data source includes one of a geospatial image, a geospatial vector data, a map, a photograph, an article and an RSS feed, the second geospatial data source includes one of a geospatial image, a geospatial vector data, a map, a photograph, an article and an RSS feed.

5. The method of claim 1, further comprising:

receiving additional geospatial datasets at the geospatial record database associated with one or more geospatial objects.

6. The method of claim 1, wherein the geospatial dataset is a first geospatial dataset, the method further comprising:

evaluating the first geospatial attribute for accuracy by:

establishing a control geospatial attribute common to both the first geospatial dataset and a trusted geospatial dataset;

comparing the control geospatial attribute of the first geospatial dataset to the control geospatial attribute of the trusted geospatial dataset to determine a margin of error for the control geospatial attribute; and determining the accuracy of the control geospatial attribute utilizing the margin of error.

7. The method of claim 6, wherein the margin of error is expressed as a percentage of difference between the control geospatial attribute of the first geospatial dataset and to the control geospatial attribute of the trusted geospatial dataset.

8. The method of claim 7, wherein the first geospatial dataset is determined to be accurate when the margin of error is within a predetermined range of percentages.

9. An apparatus, comprising:

a memory for storing a program;

a processor for executing the program;

an extraction module stored in the memory and executable by the processor, the extraction module configured to extract from a geospatial record database a geospatial dataset associated with a geospatial object, the geospatial dataset including geospatial attribute data associated with the geospatial object for a first point in time and for a second point in time; and a generation module stored in the memory and executable by the processor, the generation module configured to generate an output indicative of the geospatial dataset, the output including a first geospatial attribute data entry associated with the geospatial object for the first point in time received in the geospatial record database from a first geospatial data source, and a second geospatial data entry associated with the geospatial object for the second point in time received in the geospatial record database from a second geospatial data source.

10. The apparatus of claim 9, wherein the first geospatial attribute data entry and the second geospatial attribute data entry each include a name, a type, a location, and a point in time associated with the geospatial object.

11. The apparatus of claim 9, wherein the extraction module automatically and continuously, or periodically gathers additional geospatial datasets and stores the additional geospatial datasets in the geospatial record database.

12. The apparatus of claim 9, wherein the geospatial dataset is a first geospatial dataset, the method further comprising an evaluation module stored in the memory and executable by the processor to:

establish a control geospatial attribute common between the first geospatial dataset and a trusted geospatial dataset;

compare the control geospatial attribute of the first geospatial dataset to the control geospatial attribute of the trusted geospatial dataset to determine a margin of error for the control geospatial attribute of the first geospatial dataset; and determine an accuracy of the control geospatial attribute of the first geospatial dataset based at least in part on the margin of error, the margin of error being expressed as a percentage of difference between the control geospatial attribute of the first geospatial dataset and the control geospatial attribute of the trusted geospatial dataset, the control geospatial attribute being determined to be accurate when the margin of error is within a predetermined range of percentages.

13. A non-transitory processor-readable medium storing code representing instructions to be executed by a processor, the code comprising code to cause the processor to:

extract from a geospatial record database a geospatial dataset associated with a geospatial object, the geospatial dataset including geospatial attribute data associated with the geospatial object for a first point in time and for a second point in time;

and generate an output indicative of the geospatial dataset, the output including a first geospatial attribute data entry associated with the geospatial object for the first point in time received in the geospatial record database from a first geospatial data source, and a second geospatial data entry associated with the geospatial object for the second point in time received in the geospatial record database from a second geospatial data source.

14. The non-transitory processor-readable medium storage medium of claim 13, wherein the geospatial dataset is a first geospatial dataset, further comprising code to:

evaluate the first geospatial attribute for accuracy by:

establishing a control geospatial attribute common to both the first geospatial dataset and a trusted geospatial dataset;

comparing the control geospatial attribute of the first geospatial dataset to the control geospatial attribute of the trusted geospatial dataset to determine a margin of error for the control geospatial attribute of the first geospatial attribute; and determining the accuracy of the control geospatial attribute of the first geospatial dataset utilizing the margin of error, the margin of error being expressed as a percentage of difference between the control geospatial attribute of the first geospatial dataset and the control geospatial attribute of the trusted geospatial dataset, the control geospatial attribute being determined to be accurate when the margin of error is within a predetermined range of percentages.

15. The non-transitory processor-readable medium of claim 14, wherein the first geospatial attribute data entry and the second geospatial data entry each include a name, a type, a location, and a point in time associated with the geospatial object.

16. A method for processing geospatial datasets corresponding to geospatial objects, the method comprising:

extracting geospatial attributes from the geospatial datasets;

locating the extracted geospatial attributes corresponding to a particular geospatial object at a particular point in time;

generating output indicative of the particular geospatial object at the particular point in time utilizing the located geospatial attributes;

organizing the extracted geospatial attributes into sets based upon the geospatial dataset from which the geospatial attributes were extracted;

storing each set as an entry in a geospatial record, wherein the geospatial records are further divided by geospatial attribute type; and approximating a geospatial attribute indicative of time for a first geospatial dataset lacking geospatial attributes indicative of time by:

establishing a control geospatial attribute common between the first geospatial dataset lacking a geospatial attribute indicative of time and at least one trusted geospatial dataset having a geospatial attribute indicative of time;

comparing at least one geospatial attribute of the first geospatial dataset to the same geospatial attribute of the at least one trusted geospatial dataset to determine a margin of error for the at least one geospatial attribute, wherein the margin of error is expressed as a percentage of difference between the geospatial attribute of the first geospatial dataset and the geospatial attribute of the trusted geospatial dataset; and assigning to the first geospatial dataset a geospatial attribute indicative of time equal to the geospatial attribute indicative of time of the at least one trusted geospatial dataset.

17. A device for processing geospatial datasets corresponding to geospatial objects, the device comprising:
a memory for storing a program;
a processor for executing the program;
an extraction module stored in the memory and executable by the processor to:
(i) extract geospatial attributes from the geospatial datasets and (ii) locate the extracted geospatial attributes corresponding to a particular geospatial object at a particular point in time;
a generation module stored in the memory and executable by the processor to output indicative of the particular geospatial object at the particular point in time utilizing the located geospatial attributes; and
an approximation module stored in the memory and executable by the processor to: establish a control geospatial attribute common between a first geospatial dataset lacking a geospatial attribute indicative of time and at least one trusted geospatial dataset having a geospatial attribute indicative of time;
compare at least one geospatial attribute of the first geospatial dataset to the same geospatial attribute of the at least one trusted geospatial dataset to determine a margin of error for the at least one geospatial attribute, wherein the margin of error is expressed as a percentage of difference between the geospatial attribute of the first geospatial dataset and the geospatial attribute of the trusted geospatial dataset; and
assign to the first geospatial dataset a geospatial attribute indicative of time equal to the geospatial attribute indicative of time of the at least one trusted geospatial dataset.

18. A non-transitory computer readable storage medium having a program embodied thereon, the program executable by a processor to perform a method for processing geospatial datasets corresponding to geospatial objects, the method comprising:

extracting geospatial attributes from the geospatial datasets;

locating the extracted geospatial attributes corresponding to a particular geospatial object at a particular point in time;

generating output indicative of the particular geospatial object at the particular point in time utilizing the located geospatial attributes; and evaluating an extracted geospatial attribute for accuracy by:

establishing a control geospatial attribute common between a first geospatial dataset and at least one trusted geospatial dataset;

comparing at least one geospatial attribute of the first geospatial dataset to the same geospatial attribute of the at least one trusted geospatial dataset to determine a first margin of error for the at least one geospatial attribute;

determining an accuracy of the geospatial attribute utilizing the first margin of error, wherein the first margin of error is expressed as a percentage of difference between the geospatial attribute of the first geospatial dataset and the geospatial attribute of the trusted geospatial dataset, further wherein the geospatial attribute is determined to be accurate when the first margin of error is within a predetermined range of percentages; and approximating a geospatial attribute indicative of time for a first geospatial dataset lacking a geospatial attribute indicative of time by:

establishing a control geospatial attribute common between the first geospatial dataset lacking a geospatial attribute indicative of time and at least one trusted geospatial dataset having a geospatial attribute indicative of time;

comparing at least one geospatial attribute of the first geospatial dataset lacking a geospatial attribute indicative of time to the same geospatial attribute of the at least one trusted geospatial dataset to determine a second margin of error for the at least one geospatial attribute of the first geospatial dataset lacking a geospatial attribute indicative of time, wherein the second margin of error is expressed as a percentage of difference between the geospatial attribute of the first geospatial dataset and the geospatial attribute of the trusted geospatial dataset; and if the second margin of error for the at least one geospatial attribute of the first geospatial dataset lacking a geospatial attribute indicative of time is within a predetermined range of percentages, assigning to the first geospatial dataset a geospatial attribute indicative of time equal to the geospatial attribute indicative of time of the at least one trusted geospatial dataset.

19. The method of claim 1, wherein the first point in time is the same as the second point in time, and the first geospatial data source is different than the second geospatial data source.

20. The method of claim 1, wherein the first point in time is different than the second point in time, and the first geospatial data source is the same as the second geospatial data source.

21. The method of claim 1, wherein the first point in time is different than the second point in time, the method further comprising:

generating a timeline including a first timeline entry associated with the geospatial attribute data at the first point in time and a second timeline entry associated with the geospatial attribute data at the second point in time.

22. The method of claim 1, wherein the first point in time is different than the second point in time, the method further comprising:

generating a first image associated with the first geospatial attribute data entry and generating a second image associated with the second geospatial attribute data entry.

23. The apparatus of claim 9, wherein the first point in time is the same as the second point in time, and the first geospatial data source is different than the second geospatial data source.

24. The apparatus of claim 9, wherein the first point in time is different than the second point in time, and the first geospatial data source is the same as the second geospatial data source.

25. The apparatus of claim 9, wherein the first point in time is different than the second point in time, the generation module is further configured to generate a timeline including a first timeline entry associated with the geospatial attribute data at the first point in time and a second timeline entry associated with the geospatial attribute data at the second point in time.

26. The processor-readable medium of claim 13, wherein the first point in time is the same as the second point in time, and the first geospatial data source is different than the second geospatial data source.

27. The processor-readable medium of claim 13, wherein the first point in time is different than the second point in time, and the first geospatial data source is the same as the second geospatial data source.

28. The processor-readable medium of claim 13, wherein the first point in time is different than the second point in time, the processor-readable medium further comprising code to:

generate a timeline including a first timeline entry associated with the geospatial attribute data at the first point in time and a second timeline entry associated with the geospatial attribute data at the second point in time.

\* \* \* \* \*